United States Patent
Kimura et al.

(10) Patent No.: US 7,421,921 B2
(45) Date of Patent: Sep. 9, 2008

(54) PARALLEL AXES TYPE AUTOMATIC TRANSMISSION

(75) Inventors: Mitsuo Kimura, Wako (JP); Motoo Takeda, Wako (JP); Yoshimichi Tsubata, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 187 days.

(21) Appl. No.: 11/107,779

(22) Filed: Apr. 18, 2005

(65) Prior Publication Data

US 2005/0230215 A1 Oct. 20, 2005

(30) Foreign Application Priority Data

Apr. 20, 2004 (JP) .............................. 2004-123839

(51) Int. Cl.
*F16H 3/08* (2006.01)
(52) U.S. Cl. .................... 74/331; 74/467; 74/606 R; 184/1.15; 184/6.12; 184/11.1; 184/13.1
(58) Field of Classification Search ................ 74/331, 74/467, 606 R; 184/6, 12, 11.1, 13.1, 1.5
See application file for complete search history.

(56) References Cited

U.S. PATENT DOCUMENTS

| | | | | |
|---|---|---|---|---|
| 3,710,637 A | * | 1/1973 | Fisher et al. | 74/331 |
| 3,916,714 A | * | 11/1975 | Sisson et al. | 74/331 |
| 4,245,519 A | * | 1/1981 | Herlitzek | 74/331 |
| 4,549,443 A | * | 10/1985 | White | 74/360 |
| 5,445,041 A | * | 8/1995 | Zaiser et al. | 74/331 |
| 5,573,471 A | * | 11/1996 | Shubinsky et al. | 475/207 |
| 5,592,853 A | * | 1/1997 | Rebholz et al. | 74/325 |
| 6,241,066 B1 | * | 6/2001 | Asada et al. | 192/3.63 |
| 6,494,110 B2 | * | 12/2002 | Hatakeyama | 74/331 |
| 7,121,161 B2 | * | 10/2006 | Hatakeyama | 74/359 |

FOREIGN PATENT DOCUMENTS

JP        7-10609        2/1995

\* cited by examiner

*Primary Examiner*—David D. Le
(74) *Attorney, Agent, or Firm*—Westerman, Hattori, Daniels & Adrian, LLP.

(57) ABSTRACT

A parallel axes type automatic transmission including a first input shaft having m or more (m is an integer not less than 2) wet multiplate clutches and drive gears rotatably mounted, a second input shaft having n or more (n is an integer greater than m and not less than 3) wet multiplate clutches and drive gears rotatably mounted, and a third input shaft having m or less wet multiplate clutches and drive gears rotatably mounted. The automatic transmission further includes an output shaft having a fixed final drive gear and a plurality of fixed driven gears. The first, second, and third input shafts are arranged at different levels so that the second input shaft is arranged at the highest level, the first input shaft is arranged at the middle level, and the third input shaft is arranged at the lowest level.

2 Claims, 5 Drawing Sheets

PARALLEL AXES TYPE AUTOMATIC TRANSMISSION

BACKGROUND OF THE INVENTION

1. Field of the Invention

The present invention relates generally to a parallel axes type automatic transmission, and more particularly to a shaft arrangement structure in a parallel axes type automatic transmission.

2. Description of the Related Art

A parallel axes type automatic transmission is configured so that a plurality of input shafts are arranged in parallel to an output shaft and that shift gears (drive gears) rotatably mounted on the input shafts are selectively coupled by wet multiplate clutches to transmit the rotation of the input shafts to the output shaft. The number of wet multiplate clutches is the same as that of shift gears. For example, a parallel axes type automatic transmission having three input shafts and one output shaft is known. This automatic transmission has such a configuration that two wet multiplate clutches for fourth-speed and fifth-speed gears are provided on the first input shaft, two wet multiplate clutches for first-speed and second-speed gears are provided on the second input shaft, one wet multiplate clutch for a third-speed gear is provided on the third input shaft, and the output shaft has no wet multiplate clutch. In this parallel axes type automatic transmission, the second input shaft is arranged at the highest level, and the third input shaft is arranged at the lowest level.

However, the conventional parallel axes type automatic transmission mentioned above has a problem such that the automatic transmission cannot be sufficiently reduced in size because of limiting conditions including the feasibility of mating surfaces of the automatic transmission and an engine and a mounting space for the automatic transmission on a vehicle. Further, splashes of a lubricating oil from the wet multiplate clutches mounted on the input shafts are scattered onto the inner wall of a transmission case, causing the occurrence of aeration and an increase in friction.

SUMMARY OF THE INVENTION

It is therefore an object of the present invention to provide a compact parallel axes type automatic transmission which can reduce the amount of oil scattering in a transmission case.

In accordance with an aspect of the present invention, there is provided a parallel axes type automatic transmission including a first input shaft having m or more (m is an integer not less than 2) wet multiplate clutches and drive gears rotatably mounted; a second input shaft having n or more (n is an integer greater than m and not less than 3) wet multiplate clutches and drive gears rotatably mounted; a third input shaft having m or less wet multiplate clutches and drive gears rotatably mounted; and an output shaft having a fixed final drive gear and a plurality of fixed driven gears; said first, second, and third input shafts being arranged at different levels so that said second input shaft is arranged at the highest level, said first input shaft is arranged at the middle level, and said third input shaft is arranged at the lowest level.

In the parallel axes type automatic transmission of the present invention, said second input shaft having a largest lubrication flow coefficient is arranged at the highest level, said first input shaft having a middle lubrication flow coefficient is arranged at the middle level, and said third input shaft having a smallest lubrication flow coefficient is arranged at the lowest level.

The lubrication flow coefficient mentioned above is defined as the product of a speed reducing ratio of a certain shaft with respect to a transmission input shaft and the number of wet multiplate clutches provided on said certain shaft. In the present invention, said first input shaft corresponds to the transmission input shaft. The speed reducing ratio of a certain shaft with respect to a transmission input shaft indicates the magnitude of torque to be transmitted by this certain shaft. Therefore, the lubrication flow coefficient defined above indicates the amount of cooling and lubricating oil required by the wet multiplate clutch or clutches provided on this certain shaft.

According to the present invention, the input shaft having a larger torque load and a larger number of wet multiplate clutches is arranged at a higher level. For example, m is 2, n is 3, and one wet multiplate clutch is provided on the third input shaft.

According to the present invention, the second input shaft having a largest value for the lubrication flow coefficient is arranged at the highest level, so that the oil discharged from the wet multiplate clutches mounted on the second input shaft can be effectively used as a lubricating oil to be splashed onto the first and third input shafts lower in level than the second input shaft.

As a result, the amount of oil to be supplied into the first and third input shafts can be reduced, so that the load on an oil pump can be reduced. Further, the amount of oil scattering in a transmission case can also be reduced, so that the prevention of aeration can be expected.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
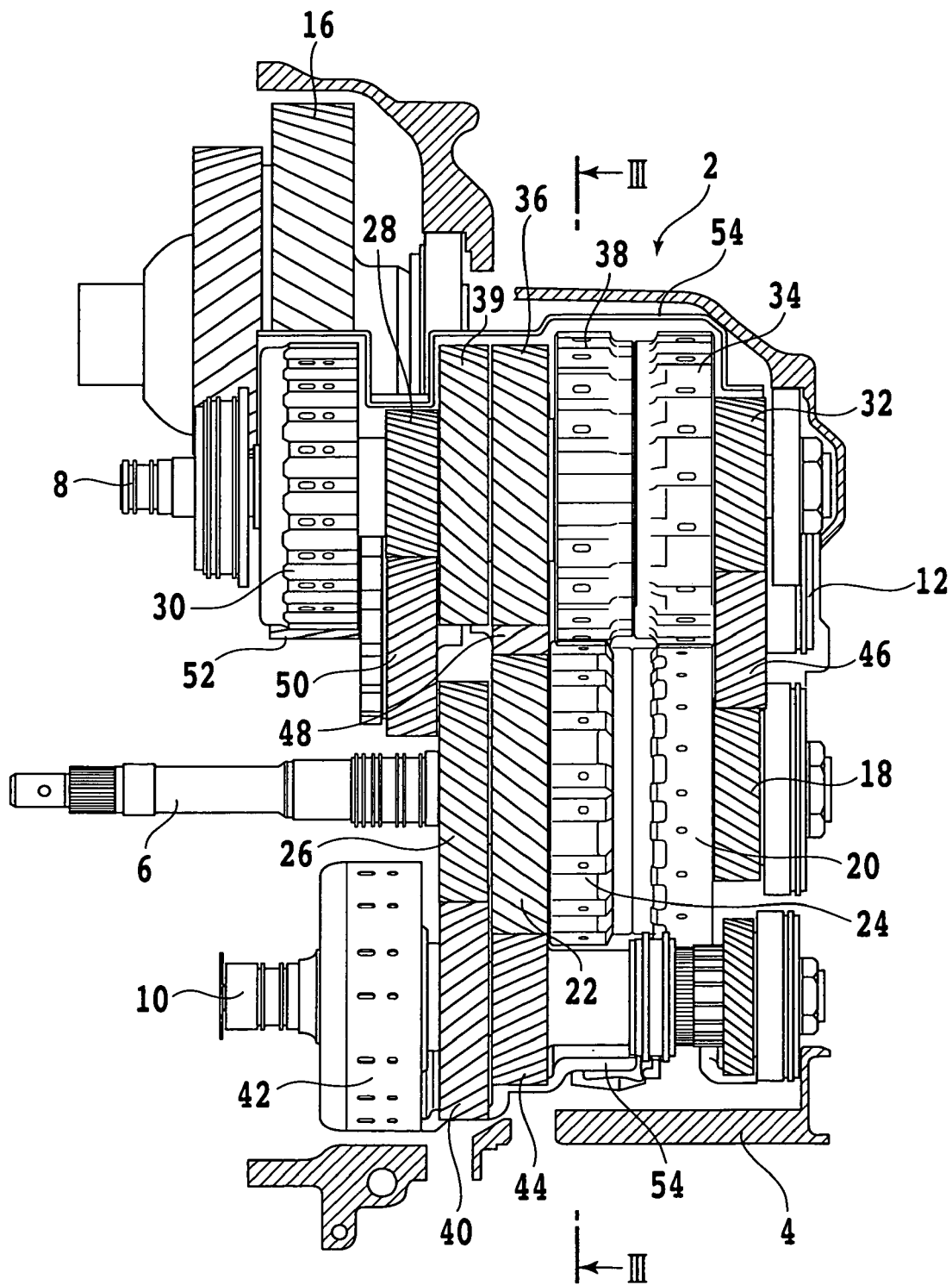
FIG. 1 is an elevational view of a parallel axes type automatic transmission according to a preferred embodiment of the present invention.
Figure 2:
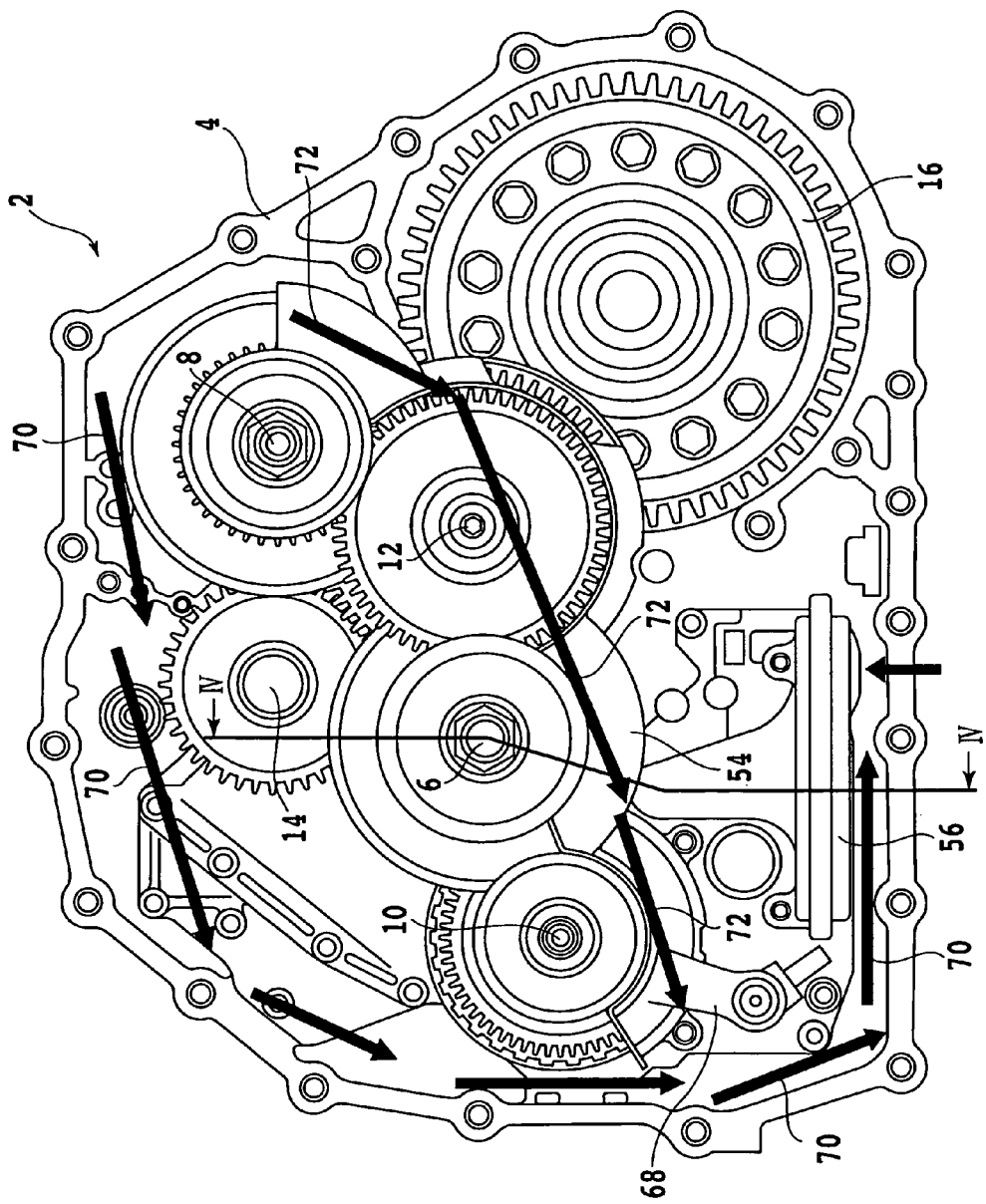
FIG. 2 is a side view of the automatic transmission shown in FIG. 1.
Figure 3:
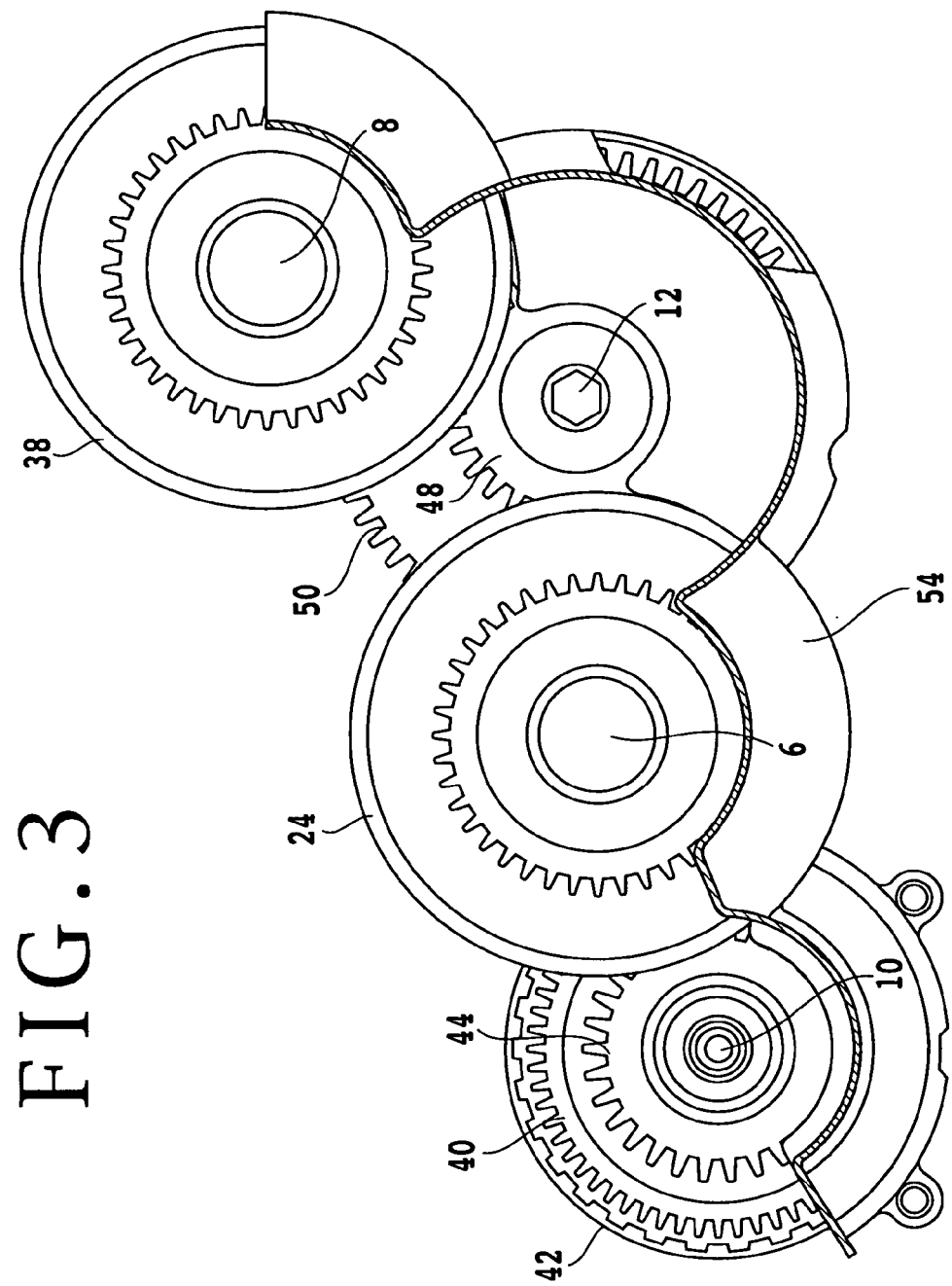
FIG. 3 is a cross section taken along the line III-III in FIG. 1.

Referring to FIG. 1, there is shown an elevational view of a parallel axes type automatic transmission 2 according to a preferred embodiment of the present invention. FIG. 2 is a side view of the automatic transmission 2 shown in FIG. 1. Reference numeral 4 denotes a transmission case of the automatic transmission 2. As best shown in FIG. 2, the automatic transmission 2 has a first input shaft (main shaft) 6, a second input shaft 8, a third input shaft 10, an output shaft (counter shaft) 12, and an idle shaft 14. These shafts 6, 8, 10, 12, and 14 are arranged in parallel to each other. Reference numeral 16 denotes a final driven gear.

As shown in FIG. 1, a third-speed drive gear 18 and a top (or highest-speed) drive gear 22 are rotatably mounted on the first input shaft 6, and a gear 26 is fixedly mounted on the first input shaft 6. When a wet multiplate clutch 20 is engaged, the third-speed drive gear 18 is fixed to the first input shaft 6, and when a wet multiplate clutch 24 is engaged, the top drive gear 22 is fixed to the first input shaft 6.

A first-speed drive gear 28, a second-speed drive gear 32, and a fifth-speed drive gear 36 are rotatably mounted on the second input shaft 8, and a gear 39 is fixedly mounted on the second input shaft 8. When a wet multiplate clutch 30 is engaged, the first-speed drive gear 28 is fixed to the second input shaft 8. When a wet multiplate clutch 34 is engaged, the second-speed drive gear 32 is fixed to the second input shaft 8. When a wet multiplate clutch 38 is engaged, the fifth-speed drive gear 36 is fixed to the second input shaft 8.

A fourth-speed drive gear 40 is rotatably mounted on the third input shaft 10, and a gear 44 is fixedly mounted on the third input shaft 10. When a wet multiplate clutch 42 is engaged, the fourth-speed drive gear 40 is fixed to the third input shaft 10.

Three driven gears 46, 48, and 50 and a gear 52 are fixedly mounted on the output shaft 12. The driven gear 46 is in mesh with the second-speed drive gear 32 and the third-speed drive gear 18. The driven gear 48 is in mesh with the fifth-speed drive gear 36 and the top drive gear 22. The driven gear 50 is in mesh with the first-speed drive gear 28. The gear 52 is a final drive gear, which is in mesh with the final driven gear 16. The idle shaft 14 shown in FIG. 2 is not shown in FIG. 1 for the purpose of clarification.

Figure 5A:
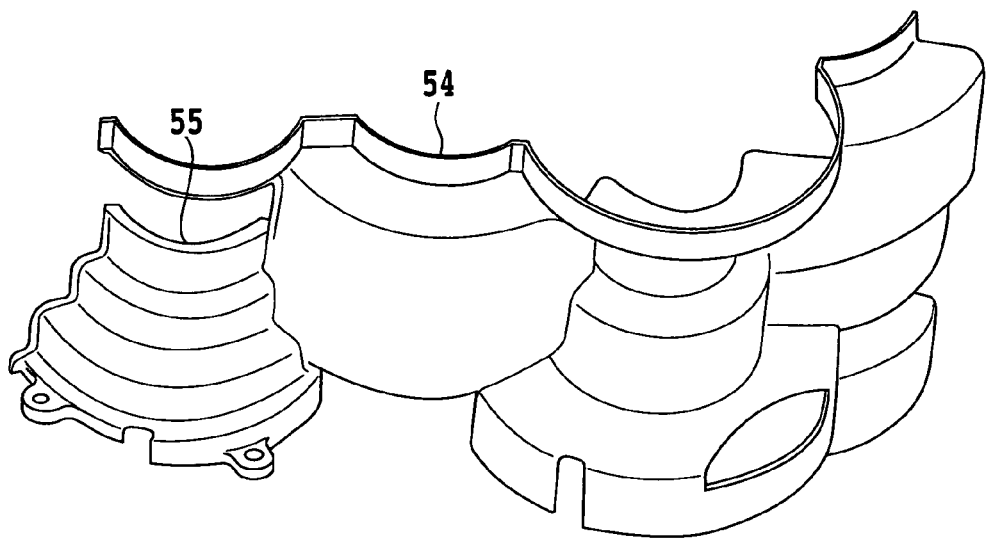
FIG. 5A is a perspective view of a baffle plate as viewed from the bottom side thereof.
Figure 5B:
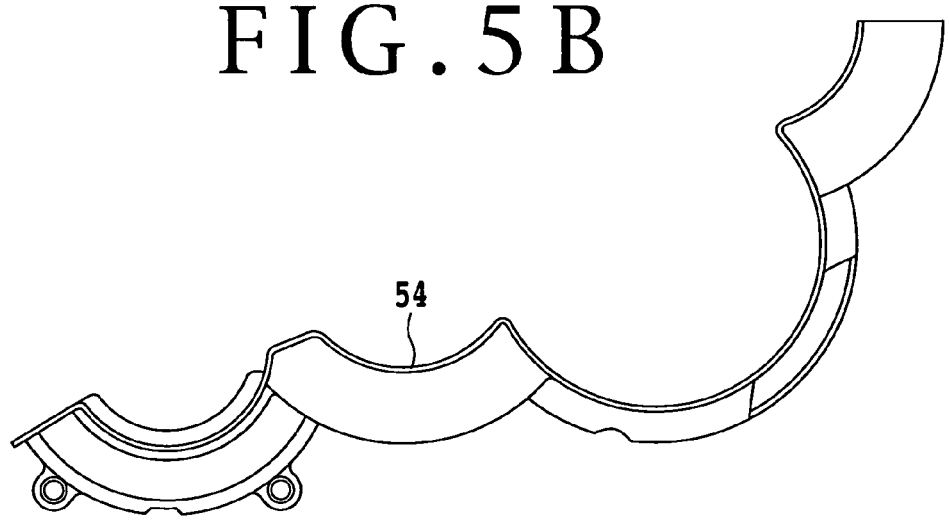
FIG. 5B is a side view of the baffle plate shown in FIG. 5A.

Referring to FIG. 2, an integral baffle plate 54 is provided so as to cover the lower side of the first, second, and third input shafts 6, 8, and 10, the output shaft 12, and the idle shaft 14. The baffle plate 54 has such a shape as shown in FIGS. 5A and 5B, and it is integrally molded of resin. FIG. 5A is a perspective view of the baffle plate 54 as viewed from the bottom side thereof, and FIG. 5B is a side view of the baffle plate 54. As shown in FIG. 5A, the baffle plate 54 has a cutout 55 for insertion of a shift fork 68.

Figure 4:
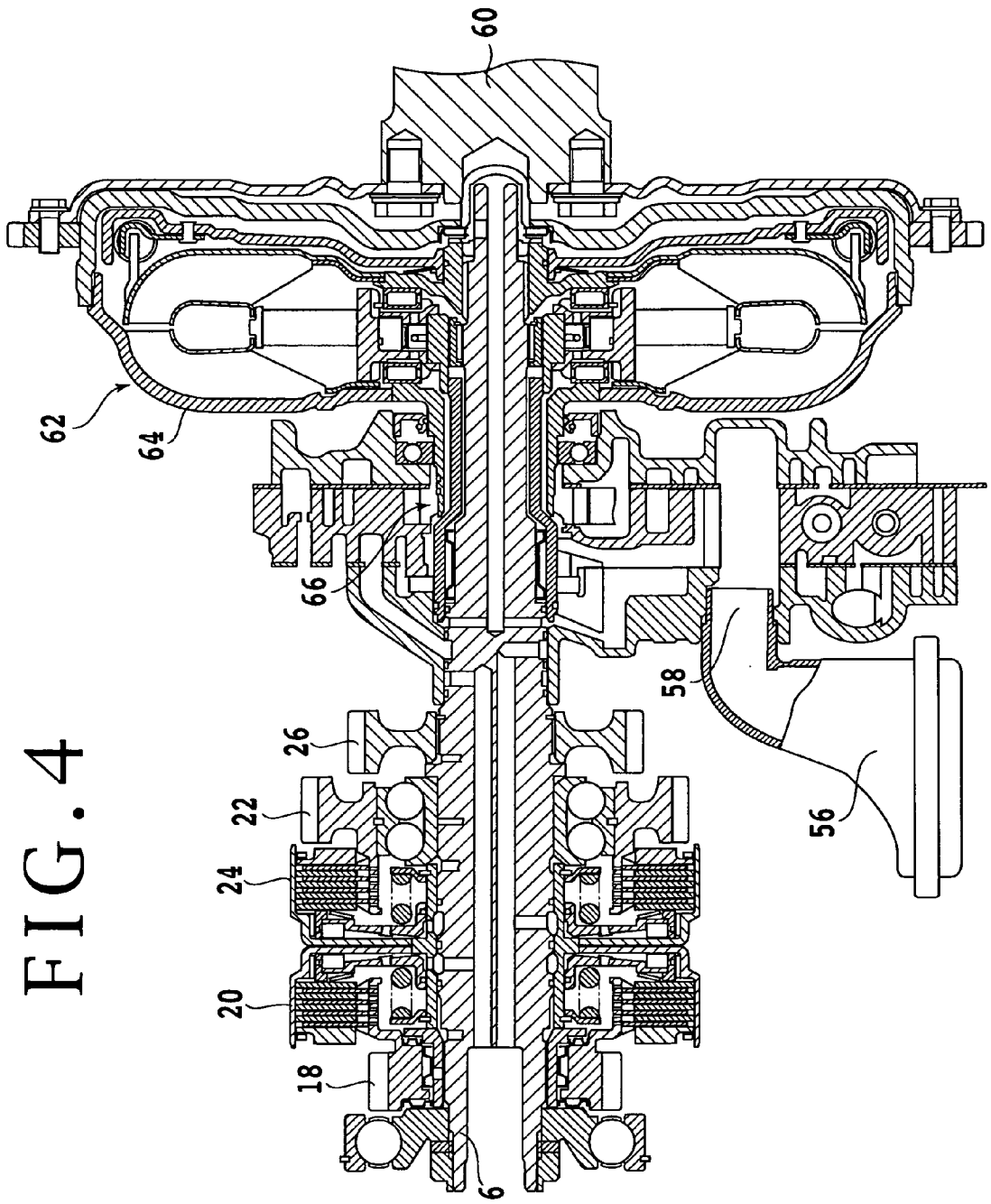
FIG. 4 is a cross section taken along the line IV-IV in FIG. 2.

As shown in FIG. 2, an oil strainer 56 is provided at a bottom portion of the transmission case 4. As shown in FIG. 4, the oil strainer 56 has a communication hole 58 connected to an oil pump 66. The oil pump 66 is connected through a case 64 of a torque converter 62 to a crankshaft 60 of an engine (not shown), so that the oil pump 66 is always driven by the engine.

As mentioned above, the gear 26 is nonrotatably fixed to the first input shaft 6, and the third-speed drive gear 18 and the top drive gear 22 are rotatably mounted on the first input shaft 6. When the wet multiplate clutch 20 is engaged, the third-speed drive gear 18 is fixed to the first input shaft 6, and when the wet multiplate clutch 24 is engaged, the top drive gear 22 is fixed to the first input shaft 6.

As apparent from FIG. 2, the relation in level among the first, second, and third input shafts 6, 8, and 10 is such that the second input shaft 8 is arranged at the highest level, the first input shaft 6 is arranged at the middle level, and the third input shaft 10 is arranged at the lowest level. Further, the second input shaft 8 has a speed reducing ratio of 1.2 to 1.3 with respect to the first input shaft 6 as a transmission input shaft, and the third input shaft 10 has a speed reducing ratio of 1.1 to 1.2 with respect to the first input shaft 6.

In the case that a lubrication flow coefficient is defined as the product of the speed reducing ratio of a certain shaft with respect to a transmission input shaft and the number of wet multiplate clutches provided on this certain shaft, the second input shaft 8 having a largest value for the lubrication flow coefficient is arranged at the highest level, the first input shaft 6 having a middle value for the lubrication flow coefficient is arranged at the middle level, and the third input shaft 10 having a smallest value for the lubrication flow coefficient is arranged at the lowest level. The speed reducing ratio of a certain shaft with respect to a transmission input shaft indicates the magnitude of torque to be transmitted by this certain shaft. Therefore, the lubrication flow coefficient defined above indicates the amount of cooling and lubricating oil required by the wet multiplate clutch or clutches provided on this certain shaft.

According to this preferred embodiment, the oil stored at the bottom portion of the transmission case 4 is raised through the oil strainer 56 by the oil pump 66, and is supplied to a hydraulic control valve and various portions to be lubricated. Further, the oil stored at the bottom portion of the transmission case 4 is also taken up by the rotation of the final driven gear 16. The oil scattered by the rotation of each shaft is guided by the inner wall of the transmission case 4 as shown by arrows 70. Further, an oil passage as shown by arrows 72 is also formed by the baffle plate 54 integrally molded.

Accordingly, the oil discharged from the wet multiplate clutch or clutches mounted on each shaft and the oil scattered from a mesh point between the shift gears can be gathered through these two oil passages 70 and 72 and returned to a position near an oil level at the bottom portion of the transmission case 4. As a result, the scattering of oil in the transmission case 4 and the agitation resistance to the final driven gear 16 can be reduced, so that the occurrence of aeration can be suppressed.

Since the second input shaft 8 having a largest value for the lubrication flow coefficient is arranged at the highest level, the oil discharged from the wet multiplate clutches mounted on the second input shaft 8 can be effectively used as a lubricating oil to be splashed onto the first and third input shafts 6 and 10 lower in level than the first input shaft 8. Accordingly, the amount of oil to be supplied into the first and third input shafts 6 and 10 can be reduced, so that the load on the oil pump 66 can be reduced. Further, the oil can be splashed through the cutout 55 of the baffle plate 54 to any machine elements including the shift fork 68 difficult in oil supplying into the relevant shaft, so that the wear, seizure, etc. of these machine elements can be prevented.

What is claimed is:

1. A parallel axes type automatic transmission comprising:
   a first input shaft having m wet multiplate clutches and m drive gears rotatably mounted, wherein m represents a quantity of clutches and of gears, and is an integer not less than 2;
   a second input shaft having n wet multiplate clutches and n drive gears rotatably mounted, wherein n represents a quantity of clutches and of gears, and is an integer greater than m and not less than 3;
   a third input shaft having at most m wet multiplate clutches and at most m drive gears rotatably mounted; and
   an output shaft having a fixed final drive gear and a plurality of fixed driven gears;
   said first, second, and third input shafts being arranged at different elevations such that said second input shaft is arranged at a highest elevation, said first input shaft is arranged at a middle elevation, and said third input shaft is arranged at a lowest elevation,
   wherein said second input shaft has a largest value for a lubrication flow coefficient, said first input shaft has a middle value for said lubrication flow coefficient, and said third input shaft has a smallest value for said lubrication flow coefficient,
   wherein said lubrication flow coefficient is the product of (1) a speed reducing ratio of an input shaft selected from said first, second and third input shafts with respect to said first input shaft, and (2) the number of wet multiplate clutches provided on said input shaft selected from said first, second and third shafts.

2. The parallel axes type automatic transmission according to claim 1, wherein m is 2, n is 3, and said third input shaft has one wet multiplate clutch.

* * * * *